United States Patent
Zaiser

[11] Patent Number: 6,131,627
[45] Date of Patent: Oct. 17, 2000

[54] PLANING MACHINE, IN PARTICULAR MANUAL PLANING MACHINE

[75] Inventor: Adolf Zaiser, Koengen, Germany

[73] Assignee: Robert Bosch GmbH, Stuttgart, Germany

[21] Appl. No.: 09/029,788

[22] PCT Filed: Aug. 20, 1996

[86] PCT No.: PCT/DE96/01573

§ 371 Date: Mar. 9, 1998

§ 102(e) Date: Mar. 9, 1998

[87] PCT Pub. No.: WO97/12734

PCT Pub. Date: Apr. 10, 1997

[30] Foreign Application Priority Data

Oct. 2, 1995 [DE] Germany ............... 195 36 559

[51] Int. Cl.[7] ................................................ B27C 1/00
[52] U.S. Cl. .................. 144/114.1; 144/218; 144/230; 144/241; 30/475; 407/41; 407/49
[58] Field of Search ................. 144/114.1, 117.1, 144/230, 218, 241; 407/49, 80, 91, 107, 108, 32, 41, 51; 30/475, 382, 478

[56] References Cited

U.S. PATENT DOCUMENTS 5,904,193 5/1999 Kellner ........................... 144/241

FOREIGN PATENT DOCUMENTS 0 117 991 B1 9/1984 European Pat. Off. .
91 52 65 7/1954 Germany .

*Primary Examiner*—W. Donald Bray
*Attorney, Agent, or Firm*—Michael J. Striker

[57] ABSTRACT

A planer (10), in particular a hand held planer for machining wood, with a planer housing (12), which includes a planer shaft (20), supported rotatably in at least one direction with an outer contour (23), which in a longitudinal groove (46) has at least one planer blade (21), which is braced on a centrifugal wedge (56) that can be prestressed with a spring (54) or the like can be produced more simply and economically in that the centrifugal wedge (56) is fastened to the planer shaft (20), elastically movably relative to it, in captive fashion solely by the spring (54), in particular being removable without destruction, and substantially without touching the planer shaft (20).

27 Claims, 8 Drawing Sheets

PLANING MACHINE, IN PARTICULAR MANUAL PLANING MACHINE

BACKGROUND OF THE INVENTION

PRIOR ART

The invention is based on a hand held planer.

German Patent DE-PS 91 52 65 discloses a planer with a planer shaft that has planer blades, extending over its width, that are clamped by centrifugal force actuated clamping wedges, that is, so-called centrifugal wedges, carried by the planer shaft. The centrifugal wedges are elastically prestressed by springs and are braced in a longitudinal groove between the planer blade and the planer shaft. The higher the rotary speed of the planer shaft, the greater then force that presses the centrifugal wedges radially outward. Accordingly, with increasing rpm of the planer shaft the clamping force with which the planer blades are firmly held relative to the planer shaft increases as well. It becomes clear from this that the centrifugal wedges must be displaceable radially outward as far as their maximum clamped position in the groove if they are to achieve their optimal clamping action quickly. This requires great dimensional accuracy and high surface quality of the centrifugal wedges and longitudinal grooves. Otherwise, it would be impossible to prevent canting of the clamping wedges would become canted in the longitudinal groove before they reach the clamping position, making for an excessively low clamping force, and as a result the planer blades could change their bearing during work with the plane and be spun out of the planer shaft - with an attendant risk of injury to humans and equipment in the vicinity of the work site.

The planer shaft in the known planer has one separate longitudinal groove for each planer blade and for each associated centrifugal wedge. The longitudinal axes of the grooves extend parallel, but the transverse axes between the groove sides extend at angles to one another. This makes it still more difficult to manufacture the planer shaft or the grooves. This increases the production costs for the known planer considerably. For changing the planer blades as the blades become dull, the self-lockingly fastened centrifugal wedges must be displaced radially inward over their entire length with a special tool, counter to the spring prestressing, in order to undo the clamping and chucking action.

From European Patent Disclosure EP 0 117 991, a planer with a planer shaft comprising profile disks is known, in the longitudinal groove of which a loose centrifugal wedge is provided for clamping the planer blade. The production costs of the planer shaft and the centrifugal wedges are high, because of the requisite high dimensional accuracy. Changing planer blades is time-consuming, because the loose centrifugal wedge is wedged in self-locking fashion in the longitudinal groove opposite the planer blade and offers only a relatively small engagement face for a special tool for pushing back the centrifugal wedge. The centrifugal wedge or the planer blade is often knocked loose in order to change planer blades, but this can damage the blade or the planer shaft.

SUMMARY OF THE INVENTION

The planer according to the invention has a centrifugal wedge which is secured elastically movable to a planer shaft in captive fashion solely via spring, in particular being removable without destruction and substantially without touching the planar shaft.

When the planer is designed in accordance with the present invention it has the advantage over the prior art that the planer shaft can be manufactured together with the centrifugal wedge and the spring from only a few easy to manufacture individual parts, and in the best case from only a single part, thus entailing only low costs for production, assembly and stockkeeping.

Because of its one-piece design, the planer or planer shaft according to the invention is lighter, easier to handle, and easy to balance and is more stably balanced over its service life than previous planers or planer shafts. Moreover, the planer blades can be clamped especially quickly without a separate auxiliary tool, or can be released and removed especially fast using an especially simple tool.

Because the centrifugal wedge is firmly held solely by the spring in captive fashion and can be removed without destruction and is movable relative to the planer shaft without touching it, and because the centrifugal wedge is undisplaceably fixed relative to the spring and the spring relative to the planer shaft, a position of the centrifugal wedge, once established in final assembly, is no longer variable without destroying the planer shaft. Hence the ideally adjusted state of the planer shaft is preserved over the entire service life of the planer shaft, since the planer blade is the only positionally variable part. The frequent unintended shifting of the adjusted position of the planer blade that often occurs in practice is thus reliably prevented.

Because the spring forming the centrifugal wedge is supported pivotably with the centrifugal wedge relative to the planer shaft essentially within the outer contour thereof, and because the spring and the centrifugal wedge are integrally joined together, and/or because the at least one groove is formed by a a leaf spring with an adjoining region of the planer shaft that thickens to form a centrifugal wedge, and/or because the spring and the centrifugal wedge form a separate part that is inserted into the planer shaft in captive fashion and is preferably pivotably supported, and/or because the planer shaft forms the spring and the centrifugal wedge, or because the spring together with the centrifugal wedge is formed by a partial notch or cutout of the planer shaft, separate guides for the centrifugal wedge are unnecessary, so that the production cost or maintenance cost for the planer is reduced still further.

An advantageous feature of the invention is obtained in that the notch or cutout of the planer shaft is an axially parallel, continuous longitudinal groove that penetrates the outer contour, and wherein a radial, rectilinear region of the longitudinal groove with two groove sides serves to clamp the planer blade in jawlike fashion, and wherein the longitudinal groove adjoining the radial region coils in curved fashion, with an essentially constant groove width.

When the planer shaft is at a standstill, the planer blade is secured against falling out or shifting, without the centrifugal-force-dictated clamping action of the centrifugal wedges, in that the groove width of the rectilinear region is slightly smaller than the thickness of the planer blade.

An especially reliable variant of the planer shaft according to the invention is obtained in that the curved region of the longitudinal groove extends outward to near the outer contour of the planer shaft, where it returns counter to or in the direction of rotation parallel and radially inward toward the longitudinal groove, wherein the curved region is U- or C-shaped, so that if the spring breaks, the centrifugal wedge and the planer blade cannot escape radially from the planer shaft.

Because a second radial longitudinal groove that changes into a curved groove is disposed next to the first longitudinal groove, and the spring and the centrifugal wedge are formed between the two grooves, a further variant of the planer shaft according to the invention that can be produced advantageously is created.

The clamping action of the centrifugal wedge ensues especially uniformly and is well-controlled fashion because the centrifugal wedge is radially pivotable and is guided, elastically suspended from the leaf spring; it comes to rest on the planer blade or slides onto it at an angle that assures self-inhibition-free clamping. As a result, when the planer shaft is at a standstill, the centrifugal wedge can return to its original release position.

The planer blade is positioned especially precisely and replicably relative to the planer shaft in that the groove side, toward the planer shaft, of the rectilinear region of the longitudinal groove changes over into a perpendicular step toward the centrifugal wedge and there forms a nose-like protrusion, and that the step acts as a stop face for the cutting edge, pointing radially inward relative to the planer shaft, of an indexable planer blade, in particular a hard-metal planer blade, and thus especially accurately determines the position of the radially outward-pointing cutting edge or the flight circle.

The planer shaft becomes especially reliable in terms of industrial safety requirements in that the protrusion, on the side remote from the step, acts as a stop for the centrifugal wedge for limiting its radially deflection outward.

The ease of use for removing or changing the planer blade is improved by providing that the groove adjoining the protrusion widens and forms a hollow space for the engagement of a screwdriver or the like for pivoting the centrifugal wedge.

The planer blade becomes even more secure against being lost by providing that the groove side toward the planer shaft has a longitudinal rib for securing engagement with a ridge groove of the planer shaft, and the cross section of the longitudinal rib is smaller than that of the ridge groove.

The production of the planer shaft is simplified considerably in that it comprises disklike profile plates, particularly of spring sheet metal, disposed axially side by side, and that the profile plates are riveted, welded, press-fitted, spray-coated, or joined in some similar way. The planer blade is made even more secure against being lost in that the profile plates carry a portion of the longitudinal groove and the groove width of at least one of the outer profile plates of the planer shaft is less than the thickness of the planer blade, whereby the planer blade is firmly held when the planer shaft is at a standstill.

Changing the planer blade becomes convenient and safe by providing that the planer housing has at least one lateral through opening for the insertion of the planer blade into the planer shaft and its removal therefrom. A still more powerful variant of the planer according to the invention is obtained in that the longitudinal groove in the outer contour of the planer shaft extends obliquely, in particular being wound in a spiral, relative to the longitudinal axis of the planer shaft and serves to receive a spiral planer blade, which is adaptable elastically to the coiled longitudinal groove and holds itself firmly in the longitudinal groove in a manner secure against falling out or against unintentional changes of position.

A factor in the convenience of use for fast blade changing is that disposed in the interior of the planer shaft in the longitudinal groove, a spreading wedge disposed slidingly or rollingly is braced on the centrifugal wedge and upon rotation of the planer shaft locks the centrifugal wedge in its clamped position while upon standstill of the planer shaft it keeps it locked, and by radial displacement it releases the centrifugal wedge and acts as a fast release means for changing the planer blade. Blade changing is speeded up in that the planer shaft has an elastic ejector, which is embodied as a leaf-spring-like part of one of the disk-like profile plates.

The planer shaft as a spare part for the planer of the invention has the advantages described above, if it is embodied in accordance with one of the defining characteristics of the foregoing claims.

Because the planer shaft itself forms the centrifugal wedge and the spring for clamping the planer blade the planer shaft carries no separate parts aside from the planer blades, so that threaded bores and the like are dispensed with, making the planer shaft simple to produce.

Because the centrifugal wedge and the spring are integrally connected to one another and are connected in captive fashion as a separate part to the planer shaft, an especially inexpensive production variant for the planer shaft made of two easy to make individual parts that are easily connected to one another is obtained.

With suitable dimensioning of the centrifugal wedge thickness or weight and of the leaf spring thickness, the planer shaft of the invention can be tailored very accurately to the intended rpm-dependent clamping force.

A particular advantage of the invention is the centrifugal wedge need not hold itself firmly in the clamping position in self-inhibiting fashion, as is the case of loose clamping wedges to secure them against falling out, but instead can automatically return to the release position, since because of the embodiment of the invention, the centrifugal wedge is precluded from falling out and being lost.

An advantageous embodiment of the invention for the special intended use of rustic planing is obtained by using a wavy planer blade in the form of a hard-metal plate of 1.1×1.5 format with minimal expenditure of material and little bulk, which corresponds to the conventional hard-metal indexable cutting inserts of the 1.1×1.5 format with a ridge groove but which in particular is provided with only a single cutting edge side.

BRIEF DESCRIPTION OF THE DRAWING

A plurality of exemplary embodiments of the invention are described below in conjunction with a drawing.

DESCRIPTION OF THE PREFERRED EMBODIMENT

Figure 1:
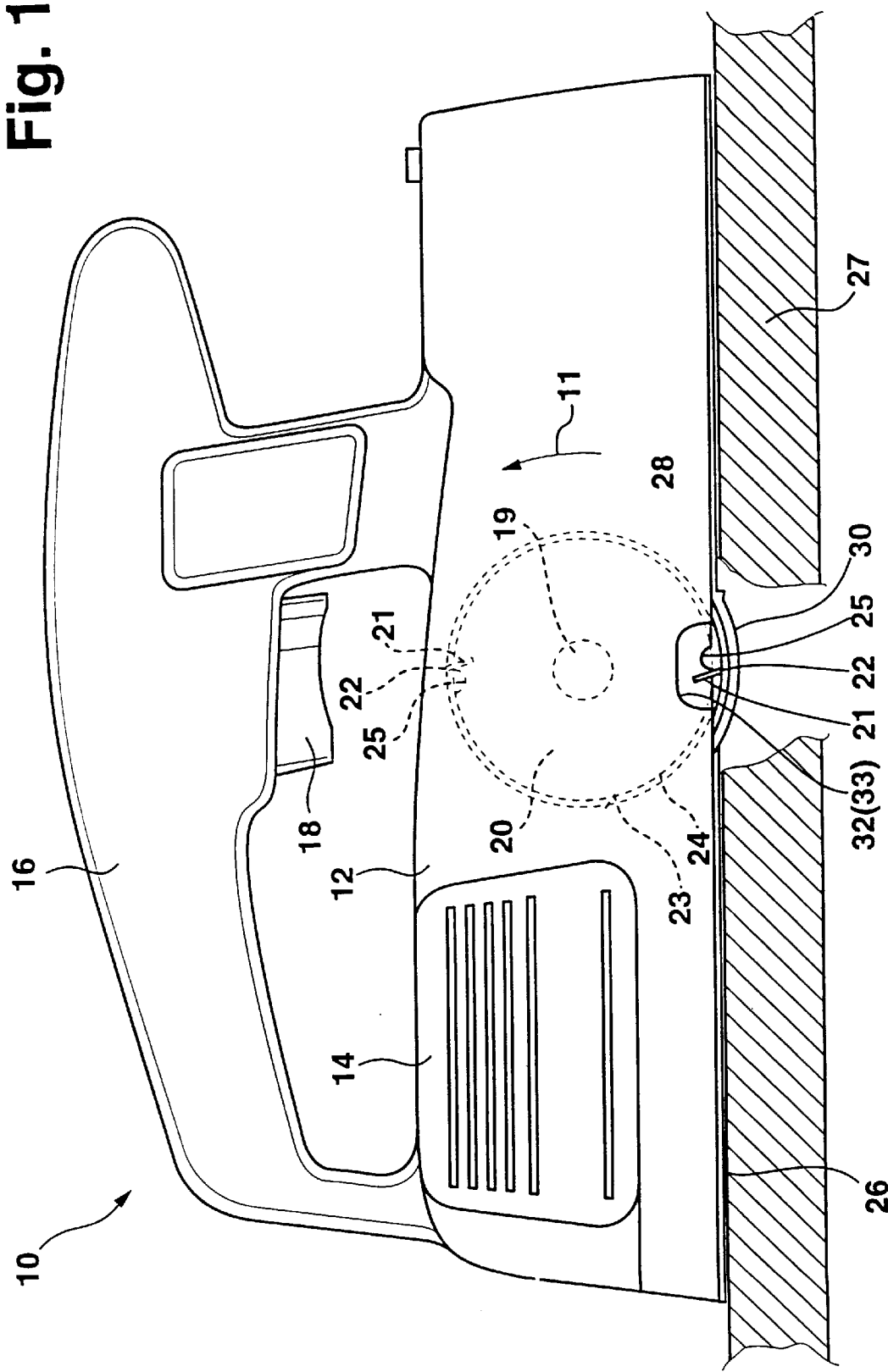
FIG. 1 shows a side view of a planer according to the invention.

A planer 10 shown in side view in FIG. 1 is embodied as a hand held planer and comprises a planer housing 12 with a motor housing 14 and a hand grip 16. The hand grip 16 has an electric switch 18.

In the planer housing 12, a planer shaft 20 is rotatably supported about the housing axis 19 in the direction of the rotary directional arrow 11 and carries planer blades 21 that have cutting edges 22, in front of which clamping grooves 25 are formed into the outer contour 23 of the planer shaft 20. Upon rotation of the planer shaft 20, the blades 19 with their cutting edges 22 determine a flight circle 24, indicated in dot-dashed lines, which protrudes past the bottom face, embodied as a sole plate 26, of the hand held planer 10, so that the cutting edges 22 can engage a workpiece 27, extending flush with the sole plate 26, in a metal-cutting fashion. An opening 28, disposed in the sole plate 26, for the passage through it of the cutting edges 22 can be closed by a swinging guard hood 30. This hood automatically closes the opening 28 as soon as the hand held planer 10 is lifted from the work piece 27. This reduces the risk of injury to the user from the rotating cutting edges 22.

The planer housing 14 has recesses 32, 34, on both sides of the planer shaft 20, through which the planer blades 21, embodied as indexable cutting inserts with two cutting edges, can be removed from or inserted into the planer shaft 20 from the side, while the clamping requires merely simple lateral insertion, because the planer blades 21 are automatically clamped when the hand held planer 10 is put into operation, by means of centrifugal wedges described below in conjunction with FIG. 2.

Figure 2:
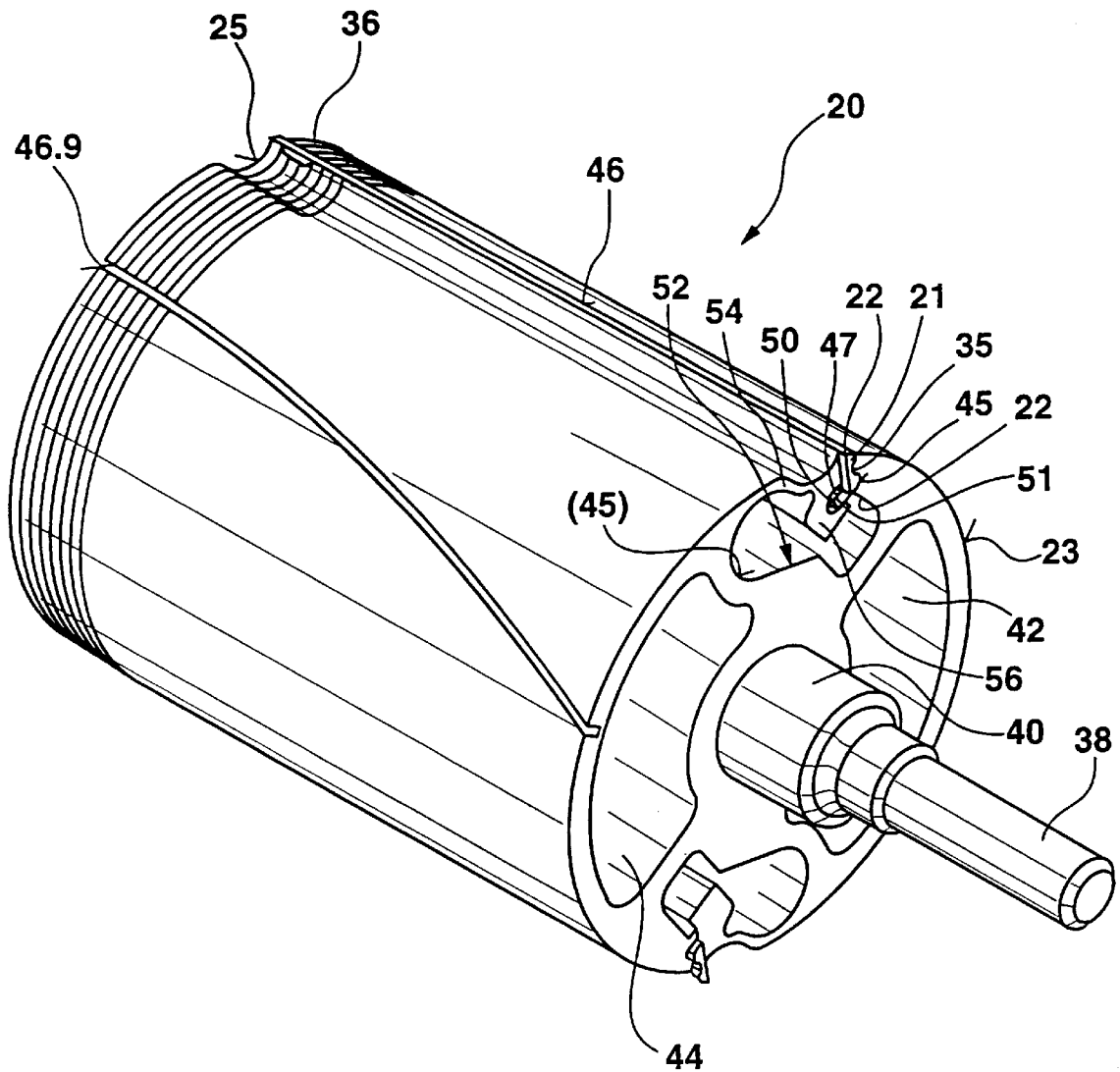
FIG. 2 is a three-dimensional view of the associated planer shaft.

The planer shaft 20 shown in FIG. 2 has a substantially circular outer contour 23. The planer shaft 20 is formed by a continuous package of essentially identical profile disks 36, of which only the first seven profile disks, located on the left in the view shown in the drawing, are specifically shown in the drawing. They are braced against one another axially on a centering shaft 38 from both outer sides by means of clamping bodies 40; the clamping bodies 40 may be designed for instance as threaded nuts screwed onto the centering shaft 38. To reduce the weight, the profile disks 36 have two opposed recesses that form hollow spaces 42, 44. The hollow spaces 42, 44 serve to allow engagement by adjusting mandrels, with which the profile disks 36 are positioned relative to one another, so that the course of the longitudinal groove 46 can be determined as aligned rectilinearly, or extending obliquely or in a spiral. The hollow spaces 42, 44 also serve to reduce the weight of the planer shaft 20 or to receive the injection plastic for packaging the profile disks.

The planer shaft 20, on two opposed sides, carries the planer blades 21, which are provided in the form of thin hard-metal miniature indexable cutting inserts, with two cutting edges 22 and a ridge groove 35.

The planer blades 21 are fastened in a longitudinal groove 46 in the planer shaft 20 between groove sides 45, 47 of the radially rectilinear region 48 of a longitudinal groove 46. The longitudinal groove 46 extends from the outer contour 23 along a longitudinal rib 37 (see FIGS. 5, 6, 15, 16) that engages the ridge groove 39, leading radially inward with the right-hand groove side 45, to merge with a transverse step 50, and from there leads to a perpendicular rectilinear protrusion 51. Adjoining the protrusion 51, the longitudinal groove 46 widens into a curved, contoured hollow space 52. The curved contour of the groove side 45 has a course such that a thin region between the hollow space 52 and the outer contour 23 of the planer shaft forms a leaf spring 54, which thickens to form a centrifugal wedge 56, or changes into a centrifugal wedge.

The centrifugal wedge 56, with a collector groove 58 or with its groove sides 57, 59, embraces the protrusion 51 and with its radially outward-leading rectilinear side forms the left groove side 47 of the longitudinal groove 46, which is radially adjoined on the outside by the clamping groove 25. The groove side 47 is extended outward at such an angle relative to the opposed groove side 45 that in the clamping position, upon contact of the centrifugal wedge 56 with the flat side of a planer blade 21, no self-inhibition builds up between the centrifugal wedge 56 and the planer blade 21, and so the centrifugal wedge 56 can return to its release position at any time, as soon as the planer shaft 26 is in a standstill and no centrifugal force is operative. This makes changing the planer blades considerably easier.

A collector groove 58 limits the stroke of the centrifugal wedge 56 both inward and outward, to avoid overstretching of the leaf spring 54.

Although not especially emphasized in the drawing, the longitudinal groove 46 on the left, in the view of the drawing, of the outermost profile disk 36 is narrower than for the other profile disks, so that the planer blade 21 cannot unintentionally shift in position or be lost even if the planer shaft 20 is at a standstill. To release this prestressing, a screwdriver or a suitable hexagonal shaft can for instance be thrust into the hollow space under the centrifugal wedge 56 of the outermost profile disk 36 and thus pivoted into its release position, in which when the planer shaft 20 or planer 10 is placed upright, the planer blade 21 slides on its own out of the longitudinal groove 56.

Figure 3:
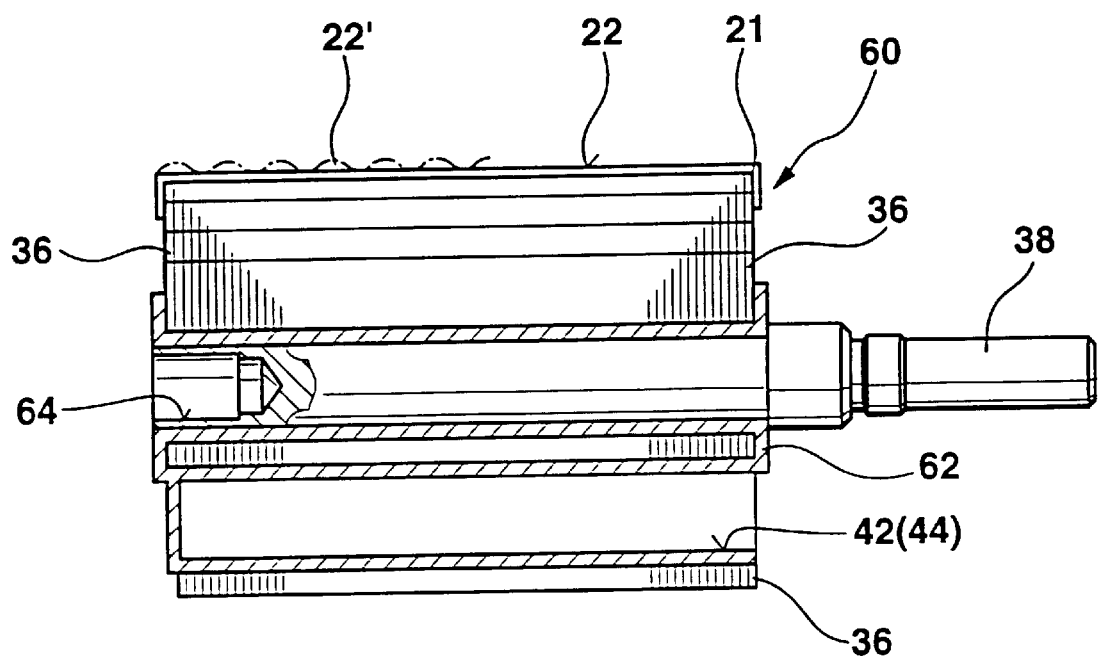
FIG. 3 is a plan view on the planer shaft of FIG. 2 with the wavy blade contour partly shown.

The side view of a planer shaft 60 shown in FIG. 3 illustrates the centering shaft 38, which carries the package of profile disks 36. The profile disks 36 are braced against one another via a plastic layer 62 and form a solid body that carries the planer blades 21. The centering shaft 38, on its left side, carries a bearing bore 64 for rotational securing of the planer shaft 60 to the planer housing. It can be seen that the plastic layer 62 is injected into the hollow spaces 42, 44 as well, thereby still further increasing the clamping or holding action exerted on the package of profile disks 36. At the top in terms of the view shown, the planer shaft 60 carries the planer blade 21 with the rectilinear cutting edge 22, above which, to the left of the vertical axis of symmetry, a wavy cutting edge 22' is shown in dot-dashed lines, which thus illustrates the fact that the rectilinear planer blade 21 can be exchanged for a wavy blade.

Figure 4:
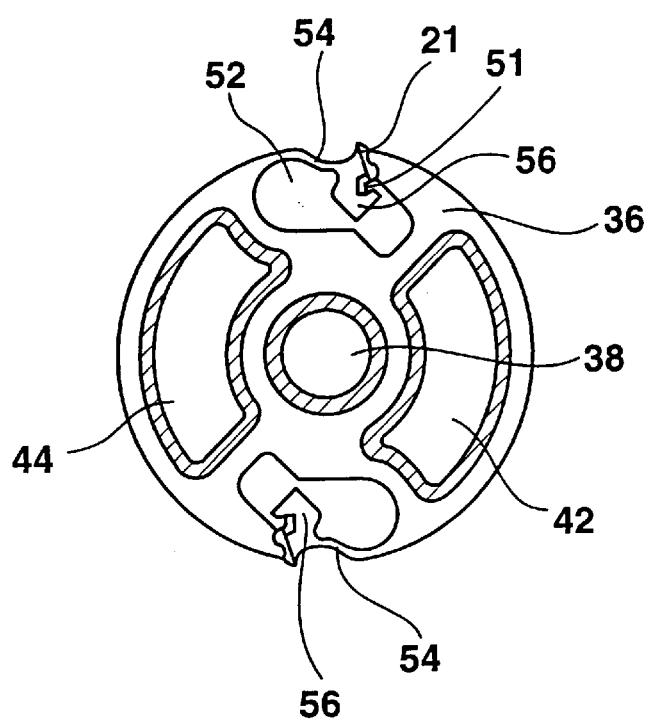
FIG. 4 is a side view of the planer shaft of FIG. 2.
Figure 5:
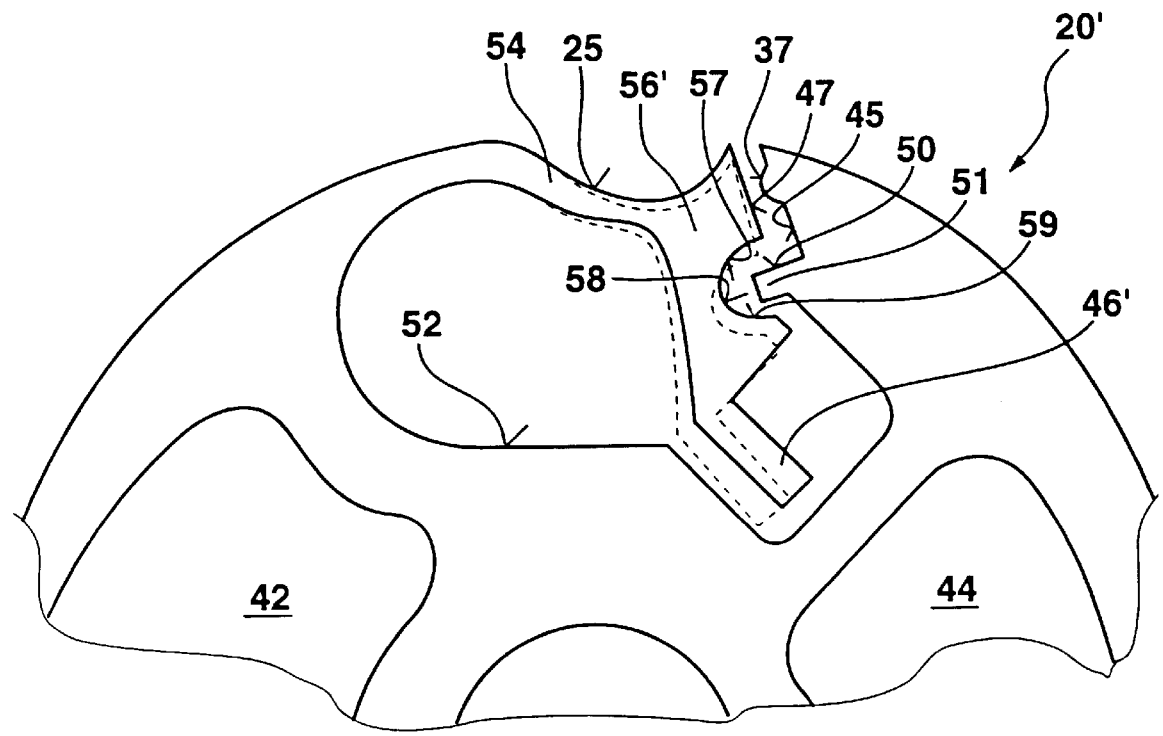
FIGS. 5 and 6 are an enlarged side view of the planer shaft of FIGS. 2–4 with a centrifugal wedge deflected maximally radially inward and outward, respectively.
Figure 6:
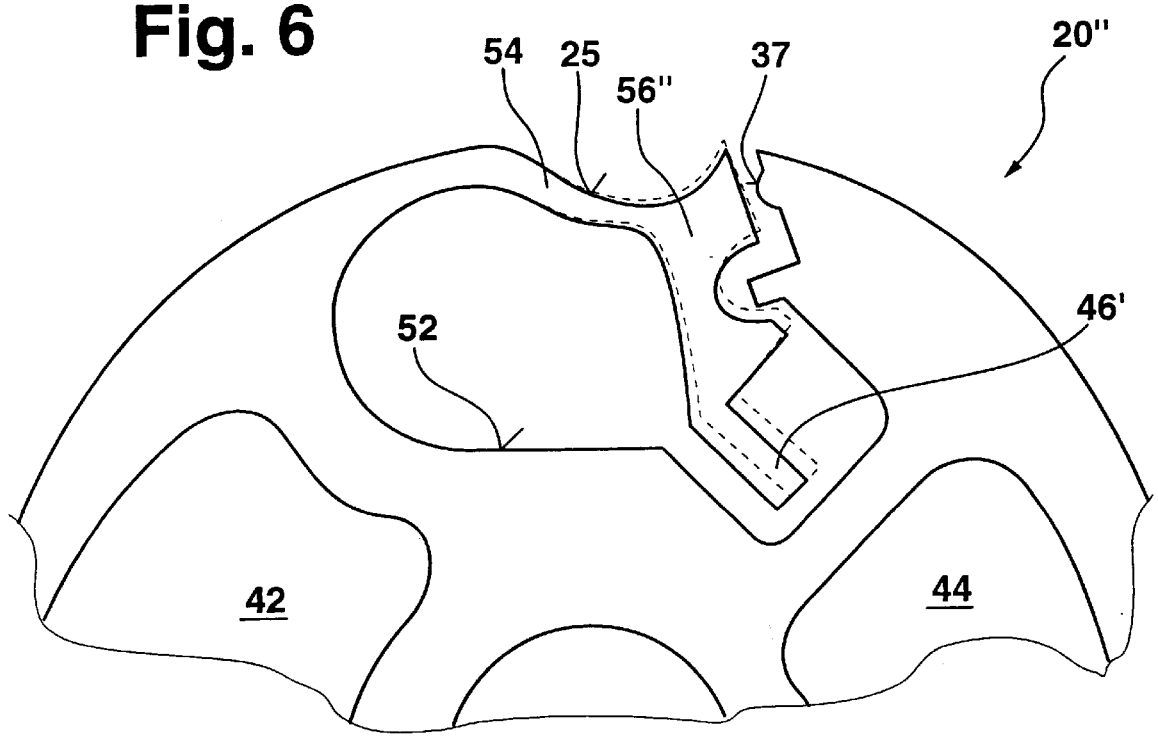

FIGS. 4, 5 and 6 show the cross section and a side view, respectively, of the package of profile disks 36, either identically or in a slightly modified variant, that is, the side view of a single profile disk 36. The drawing clearly shows the planer blades 21 with cutting edges 22 and back groove 35, the outer contour 23 of the planer shaft 20, the flight circle 24, the clamping grooves 25, the longitudinal groove 46 with the groove sides 45, 47, its radially rectilinear region 48, the transverse step 50, the protrusion 51, the hollow space 52, the leaf spring 54, and the centrifugal wedge 56 with the collector groove 58.

The centrifugal wedges 56', 56" of FIGS. 5 and 6 differ from the preceding drawing figures in having a radially inward-pointing protrusion 46', which acts as a lever arm or a tool engagement face for releasing prestressing.

FIG. 5 shows the centrifugal wedge 56 of the outer profile disk 36, which disk can firmly hold a hf with prestressing, drawn in solid lines in its normal position when the planer shaft 20 is at a standstill, and the centrifugal wedge 56 in the position shown in dashed lines, displaced radially downward in the position for releasing the planer blade.

FIG. 6 shows the centrifugal wedge 56 of a profile disk 36 drawn in solid lines in its normal position when the planer shaft is at a standstill. The centrifugal wedge 56 in the position shown in dashed lines is displaced radially outward in the outermost deflection position at maximum rpm of the planer shaft without the planer blade clamped in place. The centrifugal wedge 56 with the groove 58 holds firmly to the protrusion 41 via its groove sides 57, 59.

Figure 7:
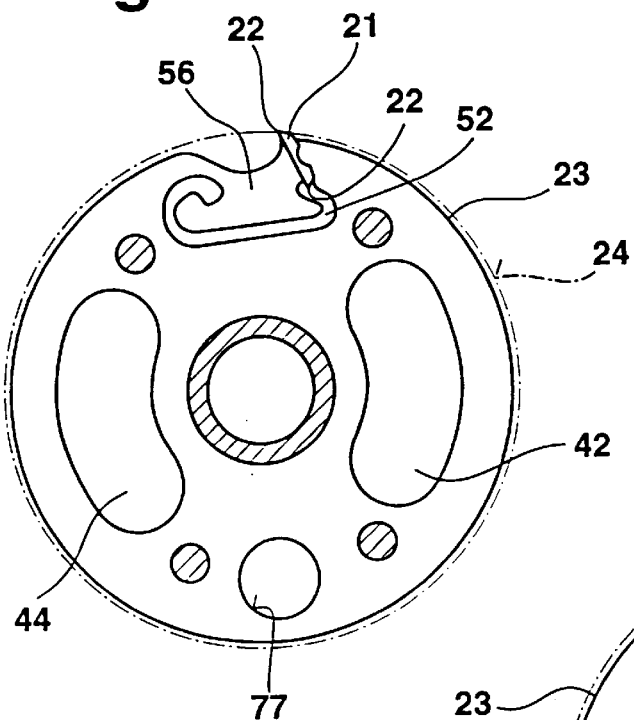
FIGS. 7–14 show enlarged side views of various exemplary embodiments of the planer shaft of the invention.
Figure 8:
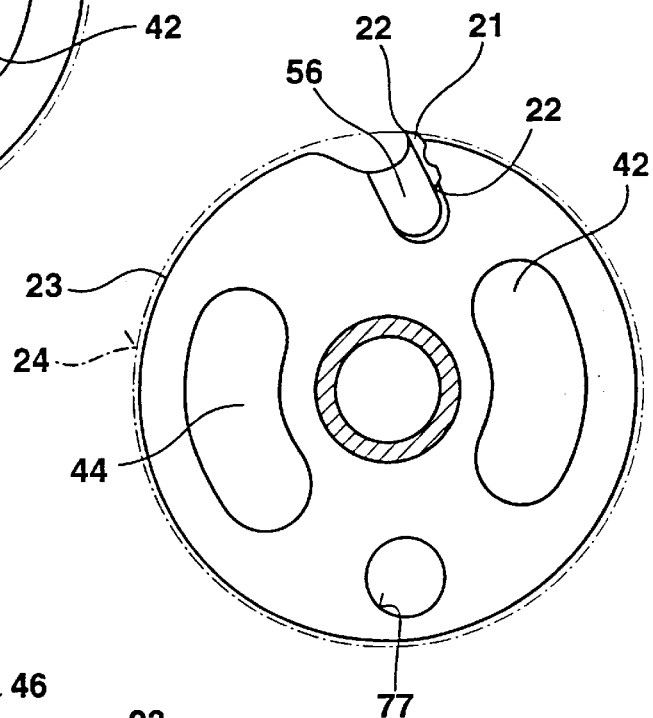
Figure 9:
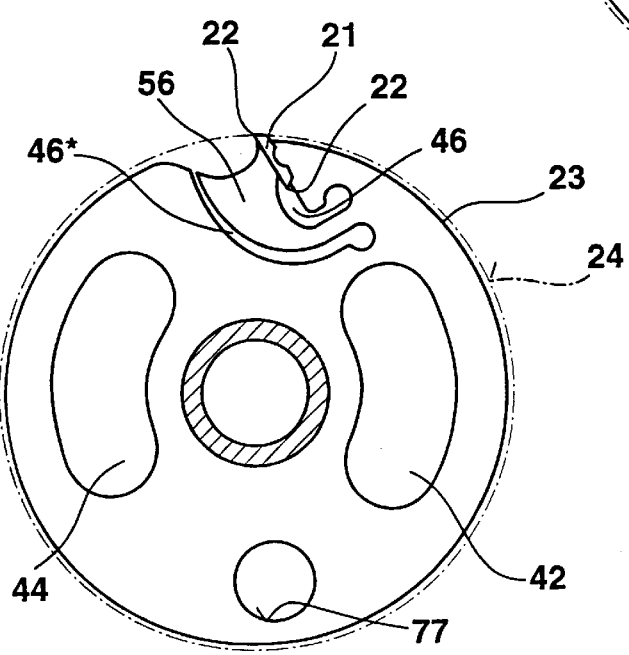

FIGS. 7, 8 and 9 show variants of the planer shaft cross section or of a profile disk with a different radial course of the longitudinal grooves, with only a single planer blade and each with a compensation bore 77 for compensating for imbalance.

In FIG. 7, the centrifugal wedge 56' is secured against being lost to the planer shaft 20' in the event that the leaf spring 54 should rip because the cross section is greater than the largest possible groove for the escape of the centrifugal wedge from the planer shaft 20'. FIG. 8 shows the cross section of a planer shaft 20", in which the longitudinal groove 46" has a U-shaped radial course. The angle of the left groove side 45" is selected to be so small that here, after the centrifugal clamping, the centrifugal wedge 56" remains in its clamping position with self inhibition.

FIG. 9 shows the cross section of a planer shaft 20''', in which two substantially parallel longitudinal grooves 46''', 43''', curved to the right in the view of the drawing, form the centrifugal wedge 56''', which after the centrifugal clamping returns to the release position, from which the planer blade 21''' can be slid easily along its longitudinal axis out of the longitudinal groove 45'''.

Figure 10:
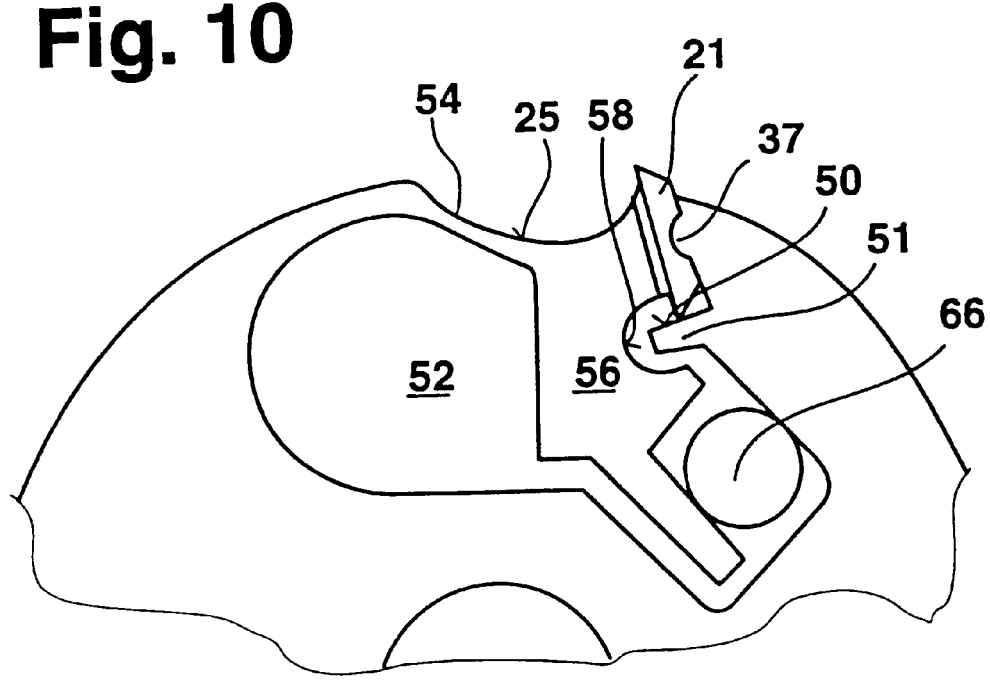
Figure 11:
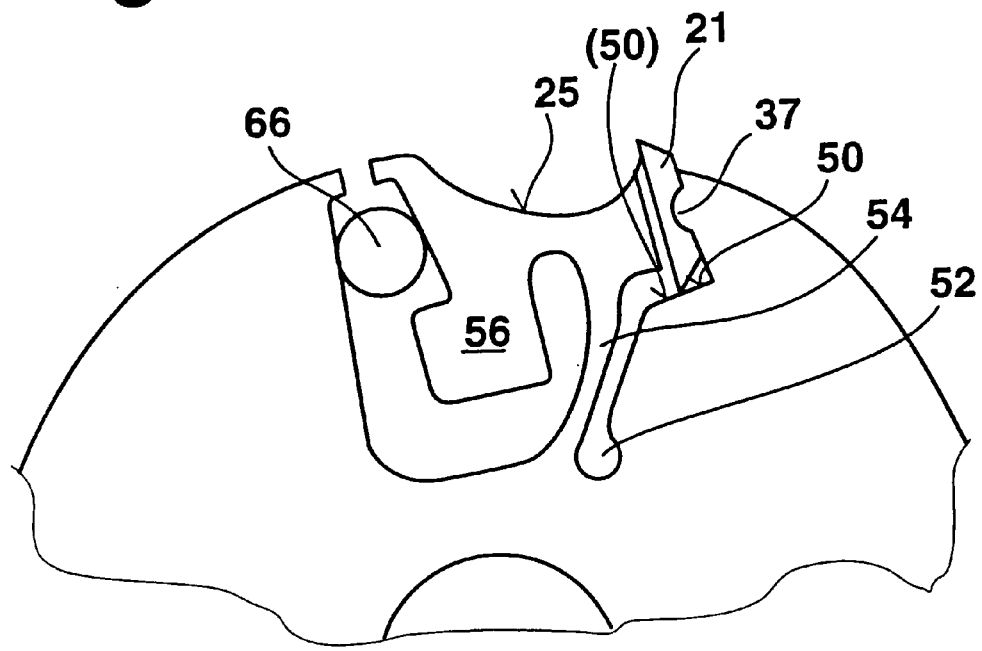
Figure 12:
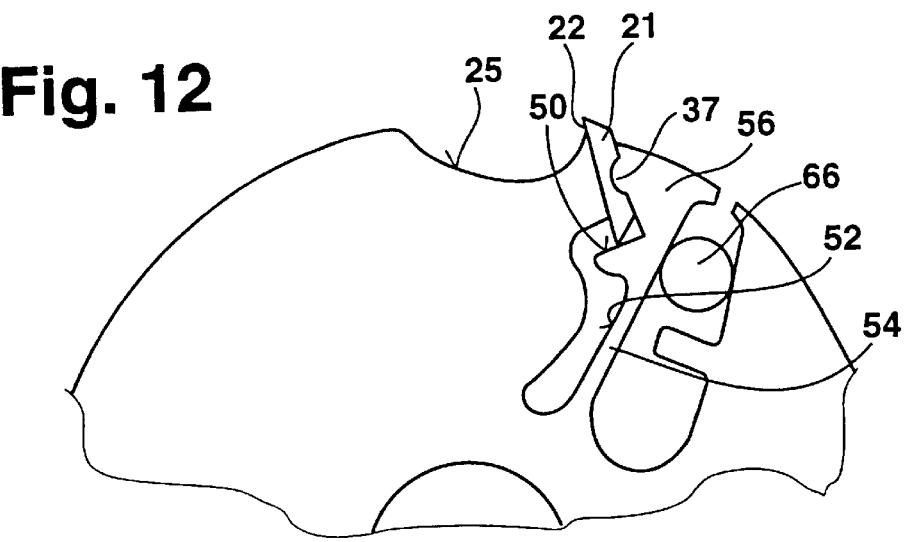

FIGS. 10–12 show variants in the design of the centrifugal wedge of the planer shaft 20 of the invention, with a clamping shaft 66 centrifugally braced on the centrifugal wedge 56"", 56'"", and 56""'. The clamping shaft 66 rolls radially outward as soon as the planer shaft rotates and thereby holds the centrifugal wedge in its clamping position even upon an ensuing standstill of the planer shaft. By radially displacing the clamping shaft 66, it is possible without an external auxiliary tool to put the centrifugal wedge into its release position very quickly and change the planer blade.

Figure 13:
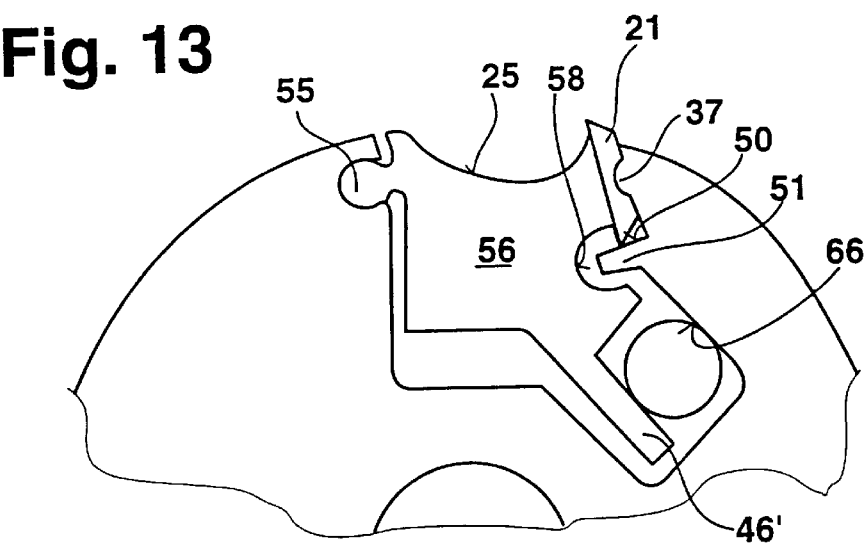

FIG. 13 shows a planer shaft 20.7, which comprises a solid cylinder into which an insertion groove 70 is milled; this groove has a circular region that acts as a pivot joint, and it serves to receive a centrifugal wedge 56.7 provided with a wavy shaped part 55. This variant of the planer shaft according to the invention can be made economically from two easily manufactured, preferably millable, individual parts.

Figure 14:
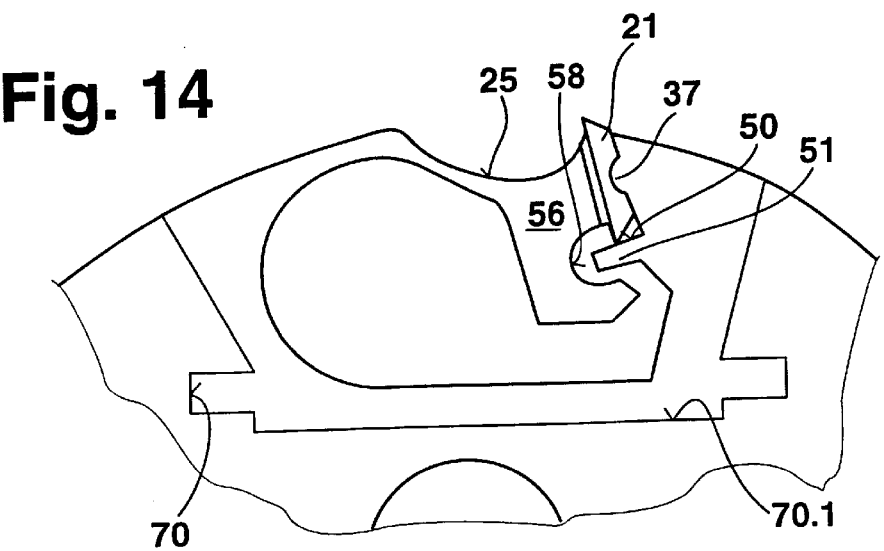

FIG. 14 shows a planer shaft 20.8, which as in FIG. 13 again comprises a solid cylinder into which an insertion groove 70.1 is milled which serves to receive a centrifugal wedge 56.8 that is provided with retaining wedges 71.72 and has a leaf spring 54.8. This variant of the planer shaft of the invention can again be made economically from two easily manufactured, preferably millable, individual parts.

Figure 15:
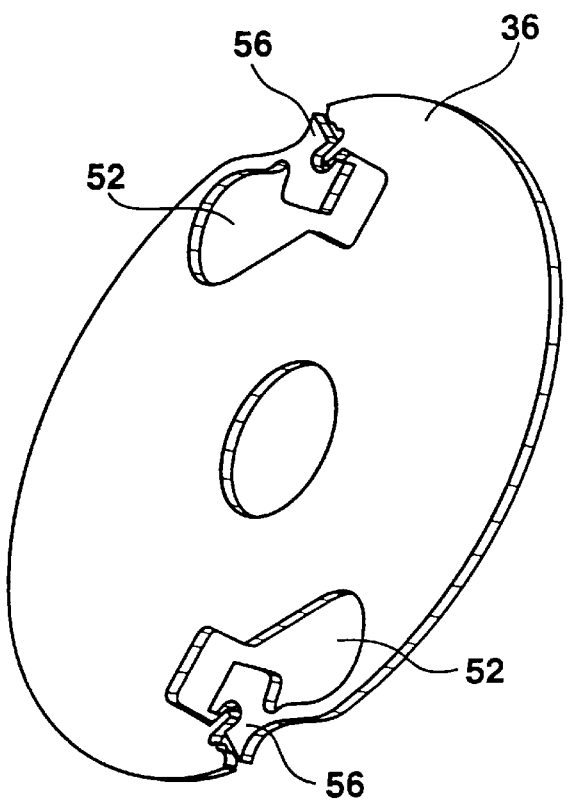
FIGS. 15, 16 show disklike segments that form the planer shaft of the invention.
Figure 16:
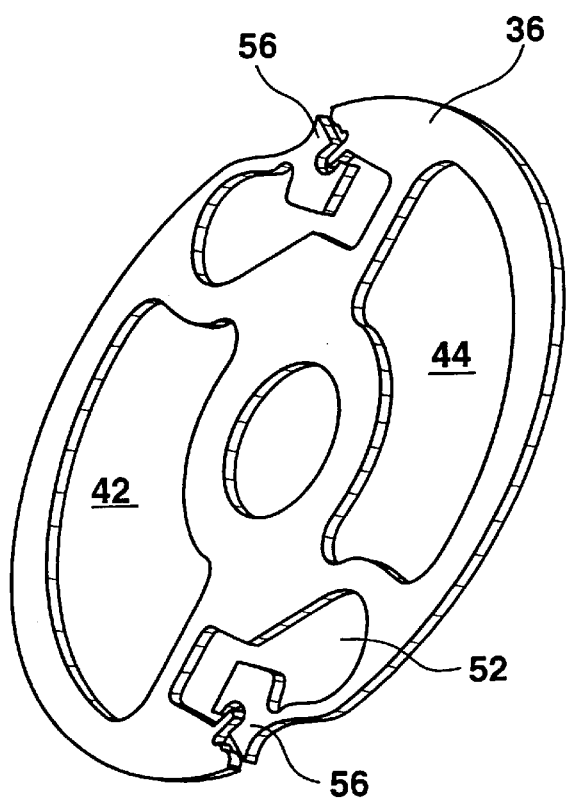

FIGS. 15, 16 show profile disks 36 as in FIG. 4 in a three-dimensional view; the profile disk 36 of FIG. 15 serves as a cover plate to close off a package formed of the profile disks 36, and to this end is made without the recesses or hollow spaces 42, 44.

The centrifugal wedge 56 is designed as dimensionally invariable relative to the leaf spring 54, which in turn is dimensionally invariable relative to the planer shaft 20, so that for changing blades, the same conditions always prevail in terms of the clamping force and the release and insertion of the planer blades. The centrifugal wedge 56 is radially pivotable because it is guided, elastically suspended from the leaf spring 54. The pivoting motion of the centrifugal wedge 56 is limited by the positive-engagement fixation of the centrifugal wedge 56 relative to the planer shaft 20.

The groove side 47, toward the planer shaft, of the rectilinear region 48 of the longitudinal groove 46 changes over into a perpendicular step 50 in the direction toward the centrifugal wedge 56, and there it forms a noselike protrusion 51, the step 50 acting as a stop for the radially inward-positioned cutting edge 22 of the planer blade 21. The step 50 holds the planer blade 21 plumb, especially positionally securely in its ideal position, in a way independent of angular errors in conventional stops associated with the flat side of the planer blades.

It is significant that the longitudinal rib 37 of the groove side 47 toward the planer shaft for securing engagement with the back groove 35 of the planer blade has; the cross section of the longitudinal rib 37 is smaller than that of the back groove 35 of the planer blade 21, so that the radially inward-located cutting edge 22 of the planer blade 21 can be braced on the step 50 without being influenced by the longitudinal rib 37.

In a further exemplary embodiment of the invention, the longitudinal groove 46.9 schematically shown in FIG. 2 in the contour 23 of the planer shaft 20 is not rectilinear and axially parallel but instead is wound obliquely and in particular in a spiral relative to the longitudinal axis of the planer shaft 20 and serves to receive a spiral planer blade, which is flexible and which as a consequence of its torsion or flexing automatically holds firmly in the coiled longitudinal groove 46.9 on being inserted into it.

In another exemplary embodiment of the invention, a spreading wedge 66 disposed slidingly or rollingly is braced on the centrifugal wedge 56 in the interior of the planer shaft 20 in the longitudinal groove 46, and upon rotation of the planer shaft 20 locks the centrifugal wedge 56 in its clamped position keeps it locked, even upon standstill of the planer shaft 20, and by radial displacement it releases the centrifugal wedge 56 and acts as a fast release means for changing the planer blade 21.

In another further exemplary embodiment of the invention, the planer shaft 20 has an elastic ejector, whose nose 50 or protrusion 51 is designed as an upward-bent, leaf-spring-like part of one of the profile disks.

The planer shaft of the invention in all the exemplary embodiments may be in either one or more parts and may comprise solid material or profile disks.

What is claimed is:

1. A hand held planer for machining wood, comprising a planer housing; a planer shaft accommodated in said housing rotatably in at least one direction and having an outer contour located inside a flight circle, said planer shaft being provided with at least one longitudinal groove; at least one planer plate arranged in said at least one longitudinal groove; a centrifugal wedge bracing said at least one planer blade; a spring prestressing said centrifugal wedge, said centrifugal wedge being secured elastically movably to said planer shaft in captive fashion solely via said spring, and being non-destructively removable substantially without touching said planer shaft.

2. A hand held planer as defined in claim 1, wherein said centrifugal wedge is immovably fixed to said spring, while said spring is immovably fixed to said planer shaft.

3. A hand held planer as defined in claim 1, wherein said spring with said centrifugal wedge form one part which is povitably held relative to said planer shaft substantially inside said outer contour of said planer shaft.

4. A hand held planer as defined in claim 1, wherein said spring with said centrifugal wedge and said longitudinal groove forms a part inserted into said planer shaft in captive fashion and pivotably supported.

5. A hand held planer as defined in claim 1, wherein said planer shaft together with said spring and said centrifugal wedge forms one part.

6. A hand held planer as defined in claim 1, wherein said spring together with said centrifugal wedge is formed by a formation of said planer shaft, which is selected from the group consisting of a partial notch and a cutout and is formed by said longitudinal groove.

7. A hand held planer as defined in claim 6, wherein said longitudinal groove which forms said formation is an axially parallel, continuous longitudinal groove which penetrates said outer contour, said longitudinal groove having a radial, rectilinear region with two groove sides which serve to clamp said planer blade in jaw like fashion.

8. A hand held planer as defined in claim 7, wherein adjoining said rectilinear region said longitudinal groove is curved with a varying groove width and determines a contour of both said centrifugal wedge and said spring.

9. A hand held planer as defined in claim 7, wherein said rectilinear region has a groove width which is slightly smaller than a thickness of said planer blade.

10. A hand held planer as defined in claim 1, wherein said longitudinal groove has a curved region which extends outward to near said outer contour of said planer shaft, where it returns contour to or in direction of rotation parallel and radially inwards, so that said curved region is U- or C-shaped.

11. A hand held planer as defined in claim 1, wherein said planer shaft has a second radial longitudinal groove which is located next to said first mentioned longitudinal groove and changes into a curved groove, said spring and said centrifugal wedge being formed between said two grooves.

12. A hand held planer as defined in claim 1, wherein said spring is formed as a lift spring, said at least one longitudinal groove forming said lift spring with an adjoining region of said planer shaft, and said lift spring thickening into said centrifugal wedge.

13. A hand held planer as defined in claim 12, wherein said centrifugal wedge is radially pivotable and is guided, elastically suspended from said lift spring.

14. A hand held planer as defined in claim 1, wherein said longitudinal groove has a rectilinear region with a groove side facing toward said planar shaft and changing over into a perpendicular step toward said centrifugal wedge so as to form a nose-like protrusion.

15. A hand held planer as defined in claim 1, wherein said planar blade has a cutting edge and is formed as an element selected from the group consisting of a hard-metal miniature cutting insert, a hard-metal wavy blade and a spiral blade; and a step acting as a stop for said cutting edge so as to determine a position of said cutting edge which is radially outward-pointing or to determine said flight circle.

16. A hand held planer as defined in claim 15; and further comprising a protrusion on a side remote from said step, said protrusion acting as a stop for limiting a radially outward deflection of said centrifugal wedge.

17. A hand held planer as defined in claim 16, wherein said longitudinal groove adjoins said protrusion and widens so as to form a hollow space for engagement of a screwdriver and the like for pivoting said centrifugal wedge in order to release said planer blade.

18. A hand held planer as defined in claim 1, wherein said planer shaft has a ridge groove, said at least one longitudinal groove having a groove side facing toward said planer shaft and having a longitudinal lip for a securing engagement with said ridge groove of said planer shaft, said longitudinal lip having a cross-section which is smaller than that of said ridge groove.

19. A hand held planer as defined in claim 1, wherein said planer shaft has a plurality of profiled disks composed of spring sheet metal and disposed axially side by side.

20. A hand held planer as defined in claim 19, and further comprising means for joining said profile disks and selected from the group consisting of riveting, welding, press-fitting and spray coating means.

21. A hand held planer as defined in claim 19, wherein said profile disks carry a portion of said at least one longitudinal groove, a groove width of at least one of outer profile disks being less than a thickness of said planer blade and serving to secure said planer blade against being lost when said planer shaft is at a standstill.

22. A hand held planer as defined in claim 1, wherein said planer housing has at least one through opening for insertion of said planer blade.

23. A hand held planer as defined in claim 1, wherein at least one longitudinal groove in said outer contour of said planer shaft extends obliquely and is wound in a spiral relative to a longitudinal axis of said planer shaft, said planer blade received in said longitudinal groove being a spiral planer blade.

24. A hand held planer as defined in claim 12, wherein said at least one longitudinal groove in an interior of said planer shaft forms a hollow space contoured in such a way that said centrifugal wedge can not emerge radially from it, for positional securing of said centrifugal wedge in the event of a distraction of said leaf spring.

25. A hand held planer as defined in claim 1; and further comprising a movably disposed spreading wedge which is braced in an interior of said planer shaft in said at least one longitudinal groove on said centrifugal wedge, and upon rotation of said planer shaft locks said centrifugal wedge in a clamped position and keeps it locked when said planer shaft is at a standstill, so that by radial displacement said spreading wedge releases said centrifugal wedge and acts as a fast release means for changing said planer blade.

26. A hand held planer as defined in claim 1, wherein said planer shaft comprises disk-like profile plates, said planer shaft having an elastic ejector which is formed as a leaf-spring-like part on one of said disk-like profile plates in form of an upward-bent formation selected from the group consisting of a nose and a protrusion, so as to make possible radial insertion of said planer blade.

27. A planer shaft for a planer, comprising a planer shaft body which is rotatable in at least one direction and having an outer contour located inside a flight circle, said planer shaft body having at least one longitudinal groove for insertion of at least one planer blade braceable on a centrifugal wedge which is prestressable by a spring and securable elastically movably to said planer shaft body in captive fashion solely via said spring and also is non-destructively removable without touching said planer shaft body.

* * * * *